UNITED STATES PATENT OFFICE.

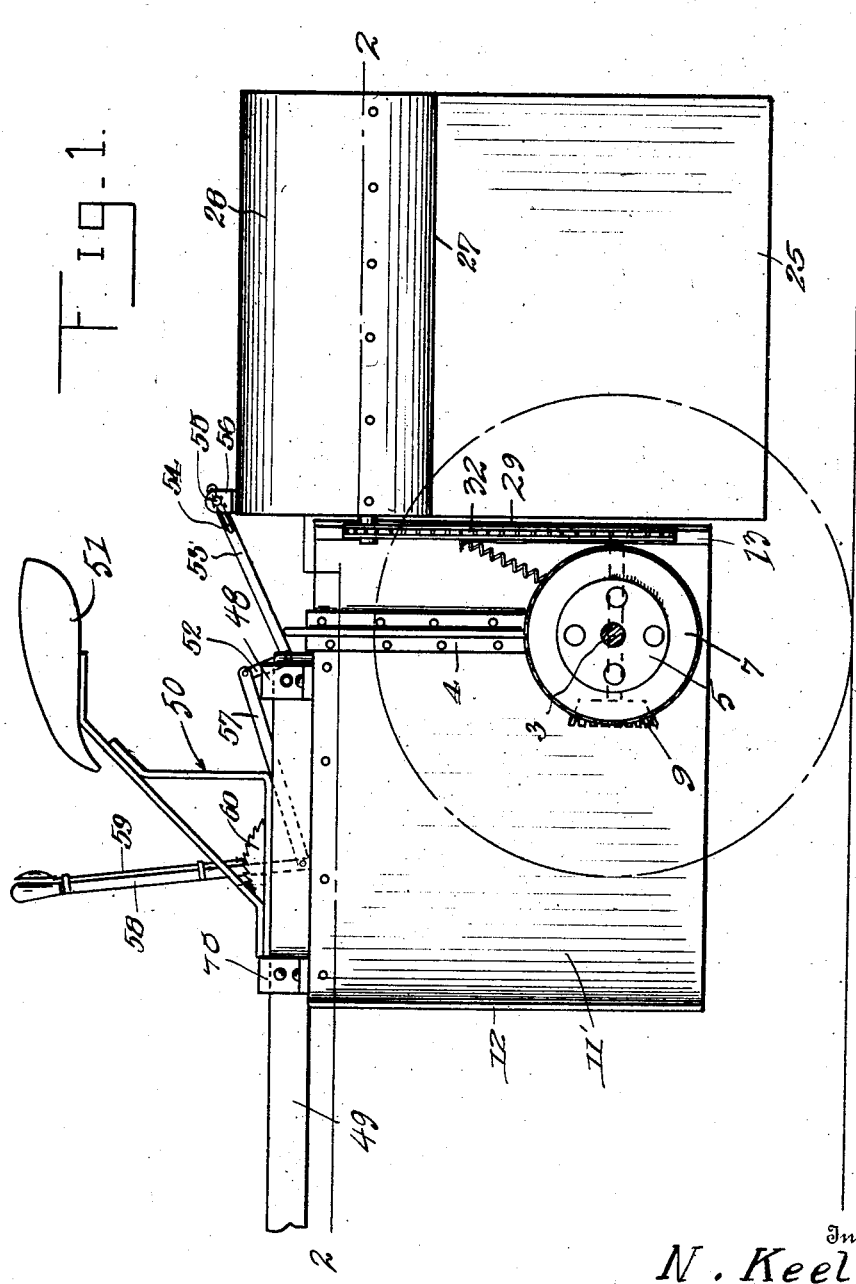

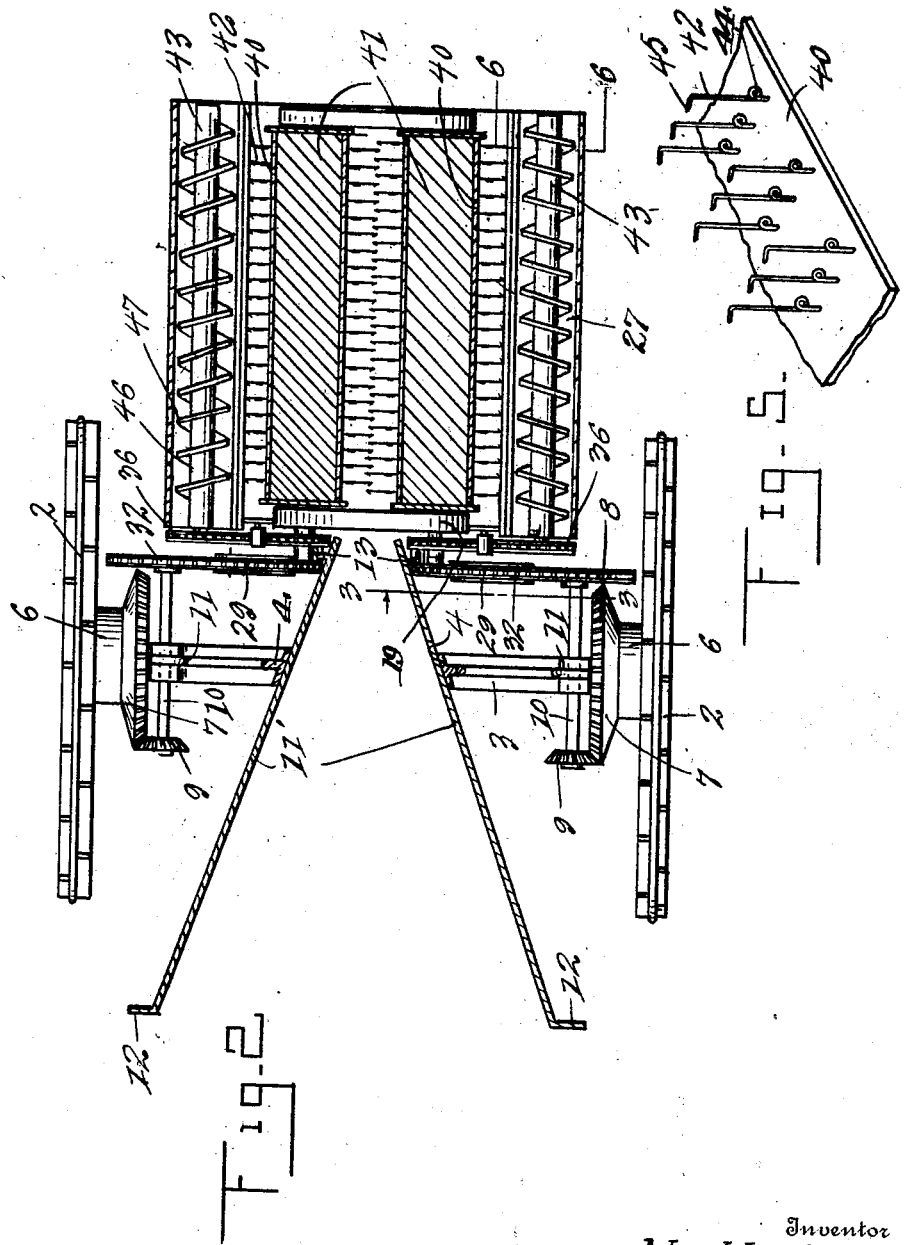

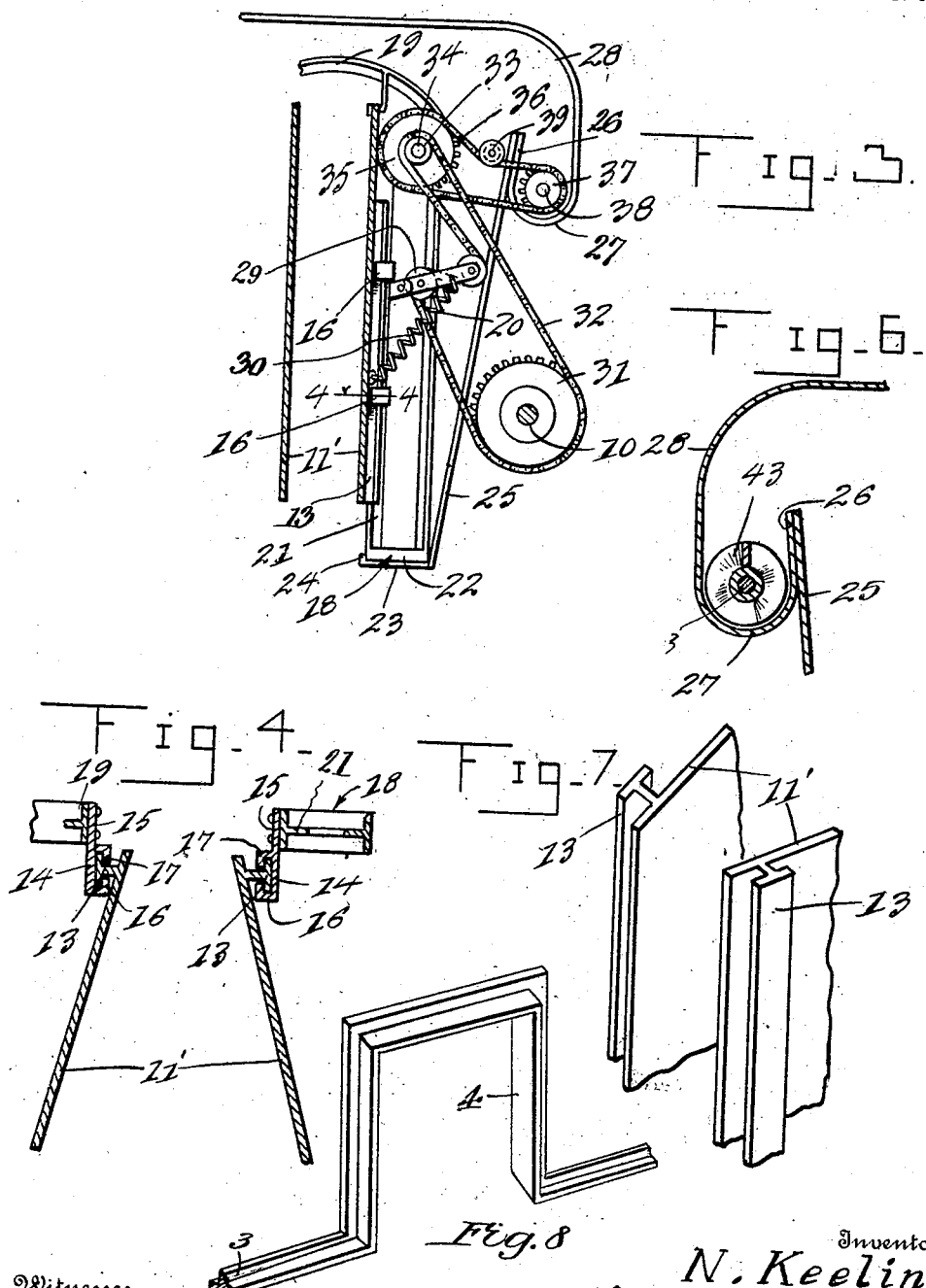

NEWTON KEELING, OF MAUMEE, ARKANSAS, ASSIGNOR OF ONE-HALF TO JOHN H. ROBINSON, OF MAUMEE, ARKANSAS.

COTTON-PICKER.

1,195,030.  Specification of Letters Patent. Patented Aug. 15, 1916.

Application filed April 16, 1913. Serial No. 761,541.

*To all whom it may concern:*

Be it known that I, NEWTON KEELING, a citizen of the United States, residing at Maumee, in the county of Searcy and State of Arkansas, have invented certain new and useful Improvements in Cotton-Pickers; and I do hereby declare the following to be a full, clear, and exact description of the invention, such as will enable others skilled in the art to which it appertains to make and use the same.

This invention relates to improvements in cotton pickers, and has for its object to provide a device of the above character which will pick the cotton from the plants without in any way injuring same, and place it in sacks or receptacles ready to receive it.

This application relates particularly to improvements in Patent No. 993,834, issued to me May 30, 1911.

I will now proceed to describe my improvements in the following specification and accompanying drawings, in which, Figure 1 is a side view of my improved cotton picker; Fig. 2 is a longitudinal sectional view taken on line 2—2 of Fig. 1; Fig. 3 is a detail sectional view of the gear and sprockets used to drive the interior mechanism of my improved cotton picker; Fig. 4 is a detail sectional view of the connection between the forward and rear frame of my improved cotton picker; Fig. 5 is a detail perspective view of a fragment of the picking belt, showing picking fingers in place; Fig. 6 is a detail sectional view of the cotton receiving trough; Fig. 7 is a detail perspective view of the T-shaped members which connect the two sections of the frame and Fig. 8 is a detail perspective view of the axle.

Referring to the drawings by characters of reference 2 indicates wheels, which are carried by the ends of axle 3. This axle is provided intermediate its ends with a U-shaped arch 4 which extends upwardly and is adapted to straddle the row of cotton over which the device is operated.

The wheels 2 are each provided adjacent their hubs with a plate 5 which plate is pierced with apertures adapted to receive bolts or rivets which pass through a collar 6 provided at one extremity with an outwardly flared portion 7 having on its opposite face gear teeth 8. These gear teeth 8 are adapted to mesh with small pinions 9 which are carried at the outward extremities of the shafts 10. These shafts 10 are journaled in suitable bearings formed on the shafts 3 and are adapted to provide drive shafts for operating the picker mechanism which will be more fully hereinafter described. Secured to the vertical arms of the U-shaped arch 4 of the axle 3 are the plates 11' which converge rearwardly as illustrated in Fig. 1. These plates are attached so that their rear ends extend beyond the rear edge of the axle and the forward ends of the plates are each provided with a flange 12 which prevents the sharp forward edges of the plates from injuring the cotton plants when the device is in use. Suitable T-shaped guide bars 13 are secured at the extreme rear ends of the plate and are adapted to form supports on which a rear picker frame is adjustably mounted. Suitable guide members 14 are attached to the rear frame and are adapted to slide on the T-shaped guide members 13 and each of the guide members 14 comprises a plate 15 provided at opposite extremities with the right angularly extended portions 16 which in turn are provided at their outer ends with the inturned flanges as clearly shown in Fig. 4. It will thus be seen that a substantially T-shaped slot is provided to receive the T-shaped guide 13 and that the rear picker frame will be slidably mounted with relation to the forward supporting frame thereby allowing the device to be used for picking large or small cotton plants.

The picker frame hereinbefore referred to comprises a pair of arched frames 19 having formed integral therewith the downwardly extending parallel arms 20 each of which terminates at its lower end in the inwardly extending bars 22 which support at their inner ends the standards 21. These standards extend upwardly and have attached thereto the guide members 14. A suitable bottom plate 23 is secured to the lower terminals of each of the arms of the frame 19 and these plates 23 are provided at their inner edges with the upturned flanges 24 which engage the inner faces of the standards 21 and provide attaching means for said plates. Secured to the outer edges of the plates 23 in any preferred manner are the upwardly extending outwardly inclined plates 25 which coöperate with the plates 23 in forming a housing for the lower runs of the picker belt as will be more fully hereinafter described. A suitable hood 28 is adapted to form a cover for the picker frame and is provided at opposite side edges with suitable downturned walls, the lower ends of which are bent inwardly and upwardly to form the troughs 27, the inner walls of which are designated by the numeral 26 and extend upwardly in parallel relation and attached to the upper edges of the plates 25. As illustrated in the drawings, it will be seen that the troughs 27 are positioned laterally of the picker frame and provide receptacles into which the picked cotton is thrown from the picker fingers.

A pivoted lever 29 is attached to each plate 11 near its rear end and connected thereto and extending downwardly to a point near the lower edge of each plate is a retractile coil spring 30. Suitable rollers are mounted on said lever and form idlers over which the drive chains of the picker belt operating mechanism runs. This lever and idlers form a tension device or take up which is adapted to take up the slack in each chain incident to the raising and lowering of the picker frame with relation to the stationary frame.

The shafts 10 are journaled in suitable bearings formed on the ends of the axle 3 and have mounted at their rear ends suitable sprockets 31 over which the picker mechanism drive chains 32 operate. These chains pass over the sprockets 33 mounted on the forward end of the shafts 34 on which the sprockets 35 are mounted. The conveyer drive chain 36 of each picker belt passes over each sprocket 35 and over a suitable sprocket 37 mounted on the forward end of each of the conveyer shafts 38. An idler, 39, mounted on an axle secured to the picker frame presses down upon the upper run of the chain, 36, to keep it taut. It will thus be seen that when the device is drawn along the ground the chain 32 will cause the picker belt and shaft 33 to revolve and this shaft revolving the sprocket 35 will drive the chain 36 and thereby cause the conveyers to be operated.

Mounted on the shafts 34 are the rolls 41 on which are secured the picker belts 40. The inner runs of said picker belt extend upwardly in space parallel relation and when the machine is in operation travel upwardly so that the picker fingers may pull the cotton from the open bolls. Each picker belt is provided with a plurality of horizontal rows of picker fingers, each of which comprises a stem portion extending through the belt 40 which is provided at its outer end with a loop 44. The fingers are designated by the numeral 42 and are formed of continuations of the loops and each of said fingers is provided with an upturned portion 45 as clearly shown in Fig. 5. Positioned in the troughs 27 and mounted on the shaft 38 are the conveyers 43 each of which comprises a main body 46 having a spiral rib or fin 47 extending throughout the entire length thereof. The diameter of the conveyer is substantially equal to the inner diameter of the trough 27 so that the cotton falling into the trough will be forced rearwardly of the machine and into a proper receptacle.

Connecting the plates 11 at their upper edges is a suitable top plate having secured to the upper side thereof suitable straps 48 for supporting the shaft pole 49. Secured to the upper face of the shaft pole is a suitable seat supporting bracket 50 having attached thereto the seat 51. Pivoted at the rear end of the pole 49 is a bell crank lever 52, the long arm 53 of which is provided with a slot 54 through which a suitable pin 55 extends which pin extends through the ear 56 secured centrally of the hood 28 thereby forming a connection between the main frame and picker frame by means of which the two frames may be relatively adjusted. A link 57 is connected to the short arm of the bell crank lever 52 and is pivoted at its opposite end to the lower end of the lever 58 carrying the latch 59 which is adapted to coöperate with the segment 60 in holding the lever in its various adjusted positions.

It will be apparent from the foregoing that in use the picker frame is adjusted on the main frame by the movement of the lever 58 and the device is then driven so that the frames straddle the row of cotton to be picked. The forward movement of the machine will cause the wheels to revolve thereby driving the picker belts and conveyers and it will be seen that as the machine passes over the cotton plants the same will be guided within the plates 11 and the picker fingers on the belts will remove the cotton from the open bolls, and throw the same into the troughs from whence they pass into suitable receptacles.

While in the foregoing there has been shown and described the preferred embodiment of this invention, it is to be understood that such changes may be made in the combination and arrangement of parts as will fall within the spirit and scope of the appended claims.

Having thus fully described my invention, what I claim is:

1. In a cotton harvester, the combination with a carriage comprising an arched axle, converging guide plates secured to the legs of said arched axle and wheels supporting the carriage, of a picker frame vertically adjustable with relation to said carriage and positioned at the rear end thereof, and means to hold said frame in various adjusted positions.

2. A cotton harvester comprising the combination with a carriage comprising an arched axle, wheels supporting said axle, converging guide plates on said axle, guides at the rear ends of said plates, of a picker frame vertically adjustable on said guides and means to hold said picker frame in its various adjusted positions.

3. In a cotton harvester, the combination with a carriage comprising an arched axle, wheels supporting the axle, converging guide plates secured to the vertical arms of said axle, guides at the rear ends of said guide plates, of a picker frame vertically adjustable on said guides, picker belts in said frame, means driven from the supporting wheels to drive the picker belt and means to adjust the picker frame vertically on the carriage.

4. In a cotton harvester, the combination with a carriage, wheels supporting said carriage, of a picker frame vertically adjustable at the rear end of the carriage, picker belts in said frame, means connected to the wheels and to the picker belts to drive the same upon rotation of the wheels, and a train of levers carried by the carriage to vertically adjust the picker frame with relation to the carriage.

5. A cotton harvester comprising an arched axle, wheels journaled upon the axle, a picker frame located wholly in the rear of the axle, means by which the picker frame may be adjusted vertically with relation to the axle, picker mechanism carried by the frame, means for operating the picker mechanism, and guide plates located within the arch of the axle and extending forwardly and rearwardly beyond the axle, the rear ends of said plates being associated with the frame to direct the cotton plants to said mechanism.

In testimony whereof I affix my signature in presence of two witnesses.

NEWTON KEELING.

Witnesses:
GLENNIE LANGSTON,
NETTIE E. ROBINSON.